March 27, 1956 W. E. O'SHEI 2,739,336
WINDSCREEN WIPER BLADES
Filed Sept. 17, 1951 3 Sheets-Sheet 1
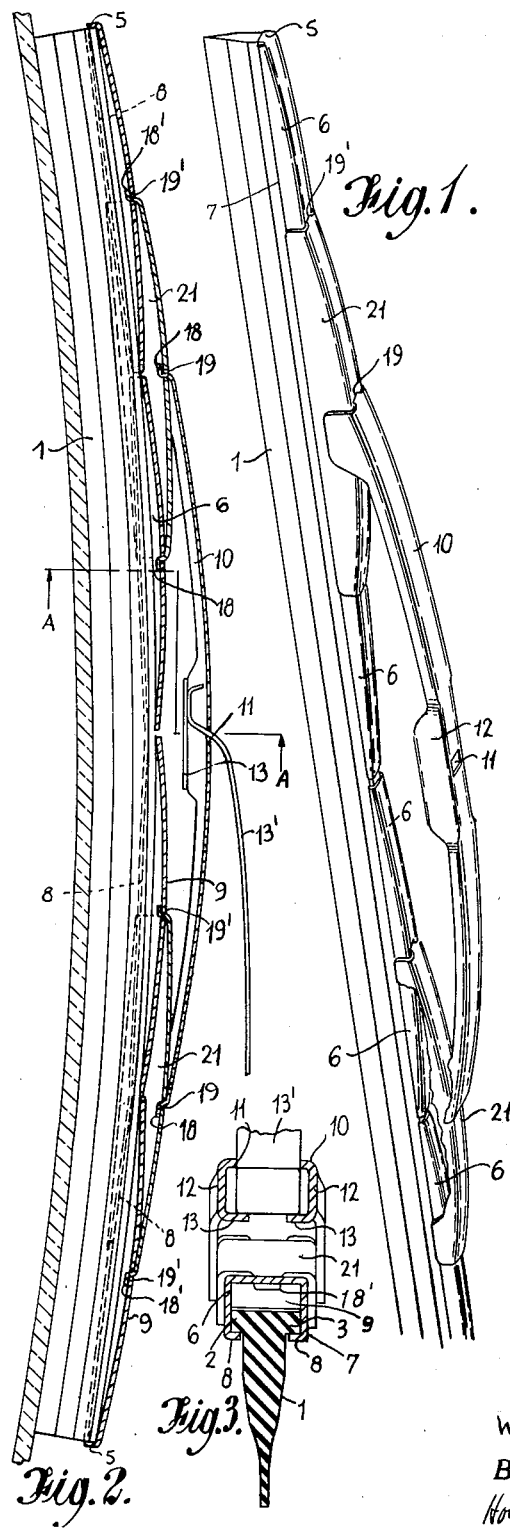
Inventor
William E. O'Shei
By
Attorneys

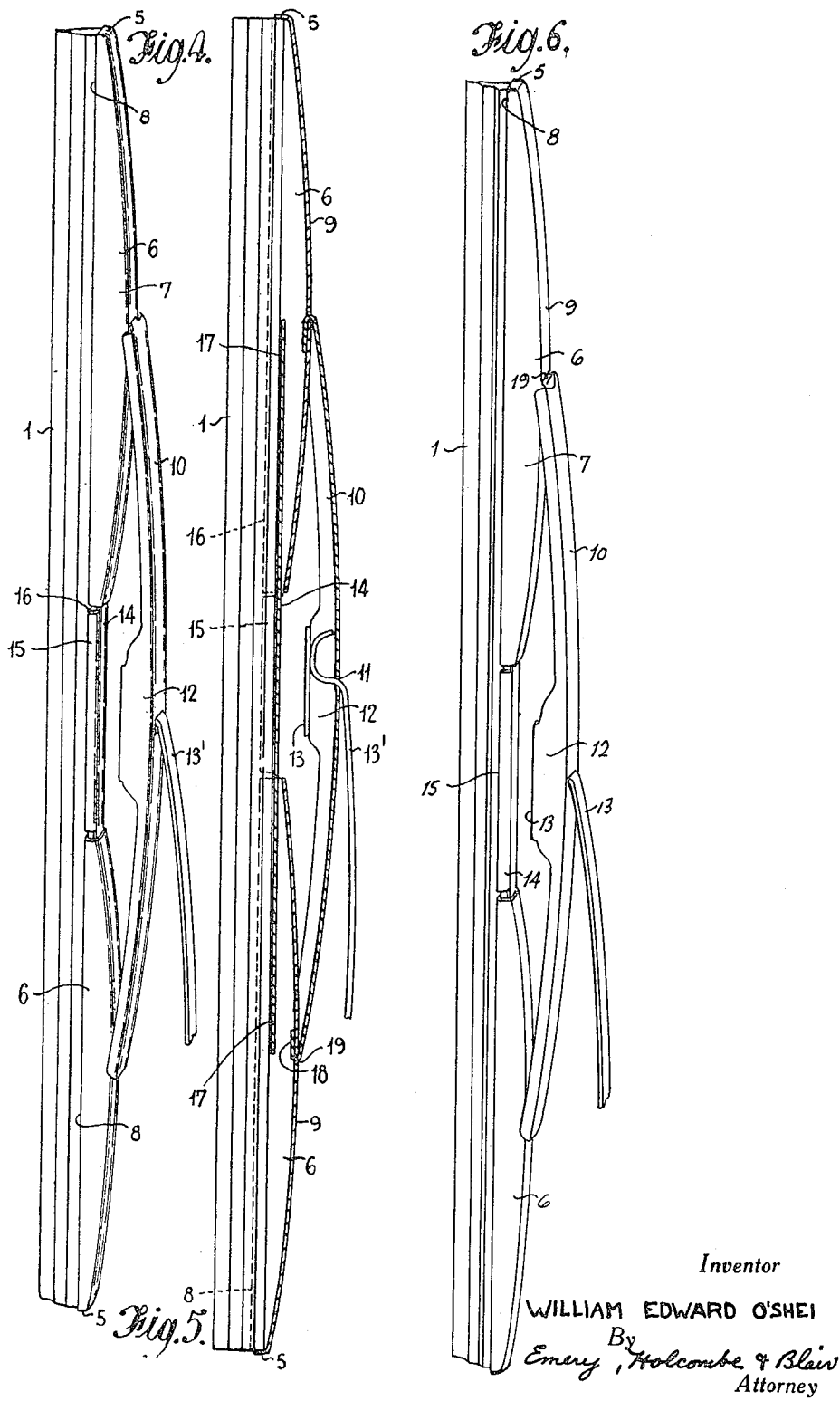

March 27, 1956 W. E. O'SHEI 2,739,336
WINDSCREEN WIPER BLADES
Filed Sept. 17, 1951 3 Sheets-Sheet 3
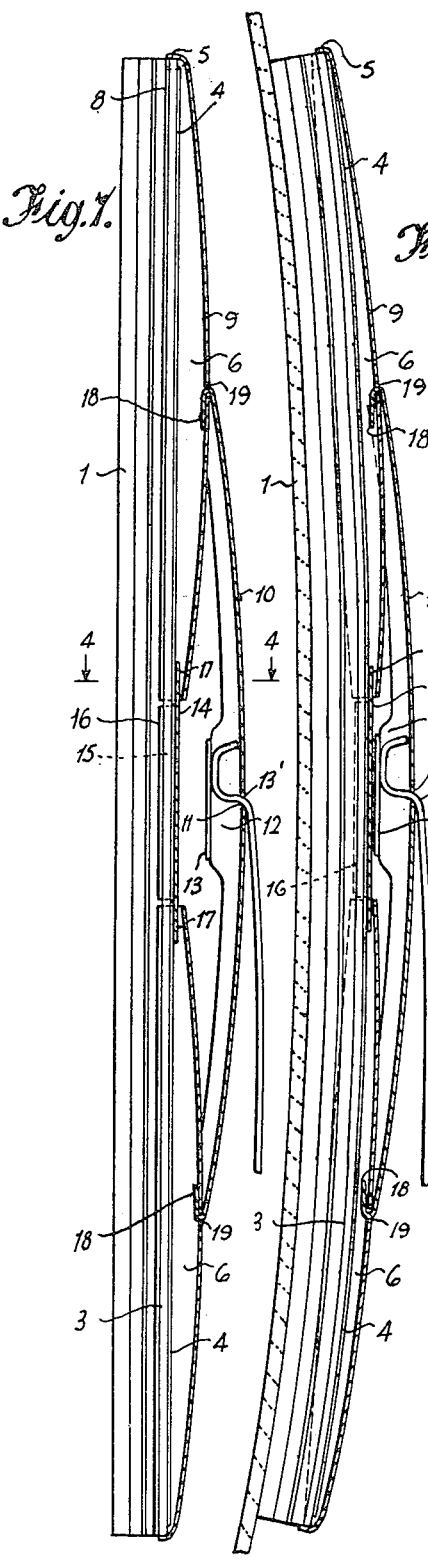
Inventor
WILLIAM EDWARD O'SHEI
By Emery, Holcombe & Blair
Attorney

United States Patent Office 2,739,336
Patented Mar. 27, 1956

2,739,336

WINDSCREEN WIPER BLADES

William Edward O'Shei, London, England

Application September 17, 1951, Serial No. 246,904

Claims priority, application Great Britain September 18, 1950

10 Claims. (Cl. 15—245)

The present invention relates to windscreen wiper blades which are capable of wiping curved windscreens.

The production of a windscreen wiper blade which will wipe a curved windscreen as efficiently as the conventional straight blade wipes a flat screen, has presented considerable problems and difficulties. Firstly, the squeegee element, made of elongated strip-like form from rubber or rubber-like material, must be mounted edgewise to the screen and be flexible in its own plane towards and away from the windscreen over which it is moving, in order to conform with the varying curvature of the screen. Secondly, the squeegee element must be maintained sufficiently rigid in the transverse direction, that is in the direction in which the blade moves over the windscreen, so that the squeegee will remain approximately straight (that is will not unduly flex) in this transverse direction as it is reciprocated across the screen.

The pressure which as to be exerted by the wiper arm on the back of curved wiper blades of known construction for maintaining them at all times, and all along their length, in wiping contact with a curved windscreen, is considerably greater than is required for maintaining a straight wiper blade in contact with a flat screen, thereby giving rise to greater friction between the squeegee element and the windscreen with consequential increased load on the driving motor. This is particularly serious when electric motors are employed for driving the windscreen and necessitates the use of more powerful and expensive electric motors than are necessary for driving straight blades on flat screens.

The present invention has for its object to provide an improved windscreen wiper blade which is suitable for wiping a curved windscreen. A further object is to provide a blade for curved windscreens which can be flexed to conform to the curvature of the windscreen with a lighter wiper arm pressure than has hitherto been necessary. Another object is to provide a wiper blade for curved windscreens which is simple to manufacture.

From one aspect the present invention consists in a windscreen wiper blade, comprising a squeegee element having a thin wiping edge or edges and which is reinforced against transverse flexing by its cross-section being increased behind said wiping edge or edges, said squeegee element being made of rubber-like material, and optionally incorporating a highly flexible material which does not substantially decrease the flexibility of the squeegee at least in the direction of its plane, and means adapted for connection to the wiper arm for transmitting the pressure exerted by the wiper arm upon the blade to points adjacent the two ends of the squeegee element and a plurality of spaced points intermediate said end points, the lengths of the squeegee element between the points at which the arm pressure is applied being free to flex in the plane of the squeegee against the inherent resilience of the material of the squeegee. With this construction the metal flexible backing strips may be entirely dispensed with, and thereby the squeegee can conform more readily to the curvature of the screen. However, if desired, a flexible backing strip or flexor may be incorporated, but it should not be interconnected with the squeegee along its whole length, but should only rest or bear against the back edge of the squeegee element so that it merely serves to urge the squeegee element to its straight position, the squeegee element being able to move towards a convex form without restriction by the flexor.

The arm pressure may be transmitted to the squeegee element through a plurality of fingers or parts arranged at longitudinally spaced points along the back region of the element, the outer fingers or parts being at or close to the ends of the squeegee element, said fingers or parts being interconnected by members extending longitudinally of the back of the squeegee, of which one member carries means for attaching the wiper arm, said members maintaining the fingers or parts in their longitudinally spaced relationship whilst permitting said fingers or parts to move in the plane of the squeegee element with reference to the arm-attaching means and thereby allow the squeegee to conform with the curvature of the screen over which the blade is adapted to move. The fingers or parts restrain transverse flexing of the squeegee at the spaced points to which they are attached thereto, and thus hold the back of the squeegee element substantially straight in the transverse direction. The fingers or parts should be spaced sufficiently close together that, for the transverse strength of the squeegee, the free length of the squeegee between adjacent fingers or parts cannot flex transversely to a substantial extent.

According to a feature of the invention, the fingers or parts are formed at, or constituted by, the ends of yoke members which are so shaped that the central regions of the yokes permit the squeegee to flex theretowards. Two such yokes interconnected by a bridge-piece, may be used. If it be desired to reduce the spacing between the fingers or parts, four smaller yokes may be fitted to the back of the squeegee element, the yokes being interconnected in pairs by secondary yokes which are in turn interconnected by the bridge-piece provided with the means for attaching the blade to the wiper arm.

The outer ends of the two yokes (or the outer yokes) engage with the squeegee element close to the ends thereof, whilst the inner ends of adjacent yokes may be spaced apart by a short distance. The distance between points of engagement of adjacent yoke ends to the squeegee element should be sufficiently short to prevent undue flexing of the squeegee element transversely. This distance will, of course, depend upon the cross-section of the squeegee which provides the transverse rigidity. If desired auxiliary clips may extend along the back of the squeegee for a part of the distance between the adjacent yoke ends, in order to increase the transverse rigidity. These clips may act as auxiliary free-floating yokes.

The ends of the yokes may embrace the back of the squeegee and engage in grooves extending longitudinally along opposite surfaces of the blade or beneath a T-shaped or bulbous reinforcement along the back edge thereof. Fingers at the ends of the yokes may fit into the said grooves or around the said enlargement to maintain the squeegee element in assembled relation with the yokes. The fingers may permit the squeegee element to slide longitudinally thereof, in which case one or more stops may be provided to restrain relative longitudinal movement between the squeegee element and the yokes. Alternatively, the fingers at one or more of the ends of the yokes may be clamped into gripping contact with the squeegee element to restrain this longitudinal movement.

According to a further feature of the invention, the yokes are made of channel cross-section, the side walls thereof being spaced apart by a distance sufficient to allow the back of the squeegee to move freely therebetween, the side walls being of such depth that the back of the squeegee element normally lies therebetween so that these side walls serve to resist transverse flexing of the back of the squeegee whilst not resisting the movement of the squeegee in its own plane. The ends of the yokes which bear against the back of the squeegee elements constitute the spaced parts for applying the arm pressure to the squeegee.

Various embodiments according to the invention will be described with reference to the accompanying drawings, in which:

Fig. 1 shows a perspective view, partly cut away, of a windscreen wiper blade according to this invention, Fig. 2 shows a longitudinal section through the blade when it is wiping over a curved section of a windscreen.

Fig. 3 shows a section along a line A—A in Fig. 2.

Fig. 4 shows a perpsective view of a modified construction of wiper blade.

Fig. 5 shows a longitudinal section through the blade of Fig. 4.

Fig. 6 shows a perspective view of a modified windscreen wiper blade according to this invention.

Fig. 7 shows a longitudinal section through the blade shown in Fig. 6 when it is wiping over a flat section of a windscreen.

Fig. 8 shows a similar longitudinal section when the blade is wiping over a curved section of a windscreen.

Fig. 9 shows a section along a line A—A in Fig. 7.

Fig. 10 shows a side view, partly in section of a further modified construction of wiper blade.

The windscreen wiper blade illustrated in Figs. 1–4 comprises a squeegee element 1 of moulded rubber-like material having a cross-section as more clearly shown in Fig. 3 with flanges 2, 3 extending from opposite surfaces along the rear edge thereof. The squeegee is moulded with its cross-section decreasing gradually towards a thin wiping edge.

Disposed along the back of the squeegee element are four yokes in the form of channel-shaped metal backing members 6 which are arranged end-to-end, each having a length of about one quarter of the length of the squeegee element. The side walls 7 of the members 6 are spaced apart by a distance slightly greater than the overall width of the rear flanges of the squeegee. The free edges of these side walls 7 are straight and provided with inwardly directed flanges 8 adapted to engage in front of the rear flanges 2, 3 of the squeegee, whilst the closed back 9 of each backing member 6 is curved from end to end to provide a clearance between the inside surface of the back of the channel and the back of the squeegee element 1 to enable the length of the squeegee embraced by a backing member 6 to flex thereinto. The central regions of the backing members 6 are interconnected in pairs by secondary yokes 21, the central regions of which are, in turn, interconnected by a bridge-piece 10 which is provided with means for attaching it to the wiper arm. The secondary yokes 21 and the bridge-piece 10 may also be of channel-form with the side walls at the ends thereof fitting respectively outside the backing members 6 and the secondary yokes. The central region of the bridge-piece is formed with deeper side walls 12, the free edges of which are flanged inwardly at 13 to form a box-like cavity into which the curved or similarly shaped end of a wiper arm 13' can be inserted through the aperture 11 in the back of the bridge-piece.

The connections between the ends of the bridge-piece 10 and the secondary yokes 21, and between the ends of the secondary yokes 21 and the backing members 6, is such as to permit the parts to rock with respect to one another about transverse axes. In the embodiments shown, these connections are formed by fingers 18, 18' projecting respectively from the ends of the bridge-piece 10 and secondary yokes 21 and extending through apertures 19, 19' in the secondary yokes and backing members respectively. The projections 18, 18' are of hooked form so that they can only be inserted through the associated apertures 19, 19' by inserting a projection through an aperture when the two parts to be connected are at right angles to one another, and then swinging the parts to the relative positions shown in the figure. When the squeegee element is fitted in the backing members, the assembled yokes and bridge-piece are prevented from swinging to positions in which they can be separated. The squeegee may be slid into the backing members from one end of the assembly, or through the spaces between adjacent backing members. The outer ends of the two outer backing members 6 are formed with turned down portions 5 which close the outer ends of the channels and prevent the squeegee element from sliding out of the ends of the blade assembly when the blade is in use. When the blade described is in use, the pressure exerted by the wiper arm is distributed, by reason of the bridge-piece and assembly of yokes, so that it is applied to the back of the squeegee element at a plurality of spaced points along the length thereof defined by the end portions of the backing members 6 which are in contact with the back of the squeegee element. The lengths of the squeegee element between these points are free to flex into the backing members, as shown in Fig. 2, to conform with the curvature of the windscreen, the yokes also turning about their hinge connections to enable the squeegee element to curve uniformly along its length. The flanges 8 prevent the squeege element from being pulled out by the backing members, and these flanges and the side walls 7 resist transverse flexing of the squeegee element.

By reason of the metal flexible backing strips being entirely dispensed with in the blade described, only the inherent resilience of the rubber-like material of the squeegee element has to be overcome in flexing the squeegee to conform to the curvature of the windscreen. This enables the pressure exerted by the wiper arm for urging the wiping edge into contact with the windscreen at all points along its length to be reduced, which consequently reduces the friction between the wiping edge and the windscreen and thus the load on the motor.

Figs. 4 and 5 show a modified construction in which only two backing members 6 are disposed along the back of the squeegee element, the central regions of these backing members being directly connected to the bridge-piece 10. In this embodiment the secondary yokes are not required.

In this embodiment the inner ends of the backing members 6 are spaced apart, and although the length of the squeegee element therebetween may be left free, it may, in order to provide additional resistance against transverse flexing, be fitted with a channel member 14 of which the side walls 15 are also provided with inwardly directed flanges 16 adapted to engage in front of the rear flanges 2 and 3 of the squeegee element. Provided that the length of this channel member does not exceed about 1½", it is not necessary for its back wall to be arched to provide clearance to permit the back of the portion of the squeegee embraced thereby to flex thereinto.

According to a feature of the invention, auxiliary means are provided which act on the squeegee element at points intermediate the points at which the wiper arm pressure is applied thereto, said auxiliary means moving rearwardly to allow the squeegee to flex to a concave form when the blade is wiping over a part of the screen of increased curvature, and moving forwardly (that is towards the wiping edge) when the blade curvature decreases as the blade moves from a curved to a flat part of the screen, thereby mechanically pushing the portion of the squeegee at said intermediate points forwardly to conform with the flattened curvature of the screen.

This is achieved with the embodiment shown in Figs. 4 and 5 by the two arms 17 projecting from opposite ends of the back wall of the member 14. These two arms 17 are formed integrally with the member and project into the backing members 6 through the gaps between the ends of the backing members and the back of the squeegee element. Each arm extends to about the centre of a backing member and bear, at least at their free ends, against the back of the squeegee element when the blade is straight. When the squeegee flexes to conform to the curvature of the screen, it will be appreciated that due to the consequent angular inclination between the backing members 6 relative to the member 14, the ends of the two arms 17 will move towards the inner surfaces of the back walls of the members 6 and thereby provide clearance to allow the squeegee to flex rearwardly into the backing members without restriction by the arms. As the blade moves on a flat portion of the windscreen, the backing members 6 and the member 14 move angularly in the reverse direction so that the ends of the arms will bear upon the central regions of the portions of the squeegee embraced by the backing members 6 and positively move these central regions forwardly to cause the squeegee to assume a straight form.

If desired, one or both of the backing members 6 may also have an arm extending from its inner end and into the channel of the member 14 (if the latter is of sufficient length to be arched) so as similarly to urge the portion of the squeegee embraced by the member 14 into a straight position when the blade is wiping over a flat portion of the screen.

According to another embodiment of the invention, the backing members, with also members such as 14, if provided, may be made from a single piece of metal, notches being formed in the side walls thereof at the places defining the ends of the backing members so as to permit the sections to flex relative to one another and thereby permit the blade to conform with the surface of a convex windscreen.

As above described, the squeegee element may be positioned between side walls of the yokes to guide its movement when the squeegee flexes in its own plane and to resist transverse flexing. According to a further modification, light leaf or other springs may be positioned within the yokes to engage with the back of the squeegee element, intermediate its points of attachment to a yoke, and tending to move the squeegee to its normally straight position.

In one embodiment, such spring means may be constituted by a thin web of rubber-like material extending along the back of the squeegee and rearwardly in the plane of the squeegee for a short distance. This web may be moulded integrally with the sqeegee, the cross-section of which may then be substantially in the form of a cross, one pair of arms being formed by the transverse flanges around which the yokes are engaged, and the other pair of arms being formed by the portion of the squeegee of decreasing cross-section leading to the wiping edge and the narrow web of thin cross-section. This cross-shaped construction assists in maintaining the squeegee straight. The narrow web may also bear at least along part of the central region of the yokes, thereby assisting in resiliently holding the squeegee in a normally straight condition.

The windscreen wiper blade illustrated in Figs. 6–9 comprises a squeegee element 1 of moulded rubber-like material having a cross-section as more clearly shown in Fig. 9, with flanges 2, 3 extending from opposite surfaces along the rear edge thereof. The squeegee is moulded with its cross-section decreasing gradually or in steps towards a thin wiping edge. Extending along the length of the rear of the element 1 is a thin metal strip or flexor 4 of a width approximately equal to the overall width of the rear flanges of the squeegee, the strip being arranged with one of its flat faces abutting against the rear of the squeegee. The flexor 4 may be made of thin spring steel.

Adjacent each end of the squeegee element is fitted a channel-shaped metal backing member 6, the side walls 7 of which are spaced apart by a distance slightly greater than the overall width of the rear flanges of the squeegee. The free edges of these side walls 7 are straight and provided with inwardly directed flanges 8 adapted to engage in front of the rear flanges 2, 3 of the squeegee, whilst the closed back 9 of each backing member 6 is curved from end to end to provide a clearance between the inside surface of the base of the channel and the back of the strip 4 to enable the length of the squeegee embraced by a backing member 6 to flex thereinto. The central regions of the backing member 6 are interconnected by a bridge-piece 10 which is provided with means for attaching it to the wiper arm 13'. This bridge-piece 10 may also be of channel form with the side walls at the ends of the bridge-piece fitting outside the backing members 6. The central region of the bridge-piece is formed with deeper side walls 12, the free edges of which are flanged inwardly at 13 to form a box-like cavity into which the curved or similarly-shaped end of a wiper arm 13' can be inserted through the aperture 11 in the back of the bridge-piece.

Between the inner ends of the backing members 6 is positioned a channel member 14 of which the side walls 15 are also provided with inwardly directed flanges 16 adapted to engage in front of the rear flanges 2, 3 of the squeegee. Provided that the length of this channel member does not exceed about 1½", it is not necessary for the back wall of the member 14 to be curved to provide clearance for permitting flexing of the back of the portion of the squeegee embraced thereby. Projecting from opposite ends of the back wall of this channel member are two fingers 17 formed integrally with the channel member and projecting for a short distance within the backing members 6, each finger 17 passing through the gap between the end of a backing member and the back of the flexor 4.

The connections between the ends of the bridge-piece 10 and the backing members 6 is such as to permit the backing members 6 to rock with respect thereto about a transverse axis. In the embodiment shown, fingers 18 projecting from the ends of the bridge-piece 10 extend through apertures 19 in the backing members 6 and are bent inwardly so as to bear against the internal surfaces of the back walls of the backing members when the blade is straight (see Fig. 7) and thereby restrain the backing members from rocking to a position in which the squeegee would assume an appreciable convex form. The fingers 18 thus prevent the inner ends of the backing members 6 from moving downwardly beyond the position in which they and the central channel member are in a substantially straight line, whilst in no way restricting the rocking of the backing members relative to the bridge-piece in the reverse direction to permit the blade to conform with the curvature of a convex windscreen, as shown in Fig. 8. When so flexed, the squeegee element flexes from end to end in a smooth curve, except for the short central region embraced by the channel member 14, against the resilience of the flexor 4. The flexor 4 normally retains the wiping edge of the squeegee substantially straight, the flanges 8 on the backing members 6 and the flanges 16 on the channel member 14 preventing the squeegee element from assuming a convex form in the regions embraced thereby respectively. The side walls of the members 6 and 14 also prevent transverse flexing of the length of the squeegee element embraced thereby.

The squeegee may be slid into the backing members as described with reference to the previous embodiments, the outer ends of the two backing members being provided with turned down portions 5 which close the outer ends of the channels and prevent the squeegee element and the flexor 4 from sliding out of the ends of the blade assembly when the blade is in use.

A modified construction of the blade is shown in Fig. 10, which is similar to that described with reference to Figs. 6 to 9 except that the backing members 6 and the channel member 14 are made from a single piece of metal, notches 20 being formed in the side walls thereof at the places defining the inner ends of the backing members so as to permit the sections to flex relative to one another and thereby permit the blade to conform with the surface of a convex windscreen.

The expression "rubber-like material" or "rubber material" used in this specification is intended to include natural rubber and synthetic rubbers, such as neoprene, the material known under the registered trade mark "Buna," polyvinyl chloride, and other elastomers which possess properties similar to natural and synthetic rubbers.

The squeegee element may be moulded to the desired cross-section or may be built up of a plurality of laminations of rubber-like material which may, for example, be vulcanised or otherwise stuck together at the rear of the squeegee element. According to a feature of the invention the thin wiping edge portion of the squeegee is made of such depth so that it can flex as the blade moves across the screen and effect the wiping action by the side surface thereof. The wiping edge should be backed up and strengthened a short distance behind the actual edge of this portion, for example by increasing the cross-section of the squeegee gradually or in steps behind the wiping edge. If desired, the wiping edge may be trimmed to a normally concave form so that the depth of the wiping edge is greater at the ends of the squeegee than at its centre. The outer ends can thus flex over a greater extent than the central region, and thus allow the squeegee more easily to conform to the variations in curvature of the windscreen.

Whilst particular embodiments have been described, it is to be understood that various modifications may be made without departing from the scope of the invention. For example, the flanges 8 need not extend along the entire length of the edges of the side walls of the backing members but can be replaced by flange sections or fingers located only at the ends of a backing member or at spaced points therealong.

I claim:

1. A windscreen wiper blade comprising an elongated squeegee element having flanges projecting outwardly from its opposite surfaces adjacent the rear of the squeegee element, at least two rigid channel-shaped backing members embracing the rear of the squeegee element and disposed end to end with the channel side walls extending along opposite sides of said flanges, said side walls having inwardly directed flanges extending therealong and engaging in front of the said flanges at the rear of the squeegee element to hold the squeegee and backing members in assembled relationship and to prevent the squeegee from being flexed out of the open edges of the backing members, the channel bases of said backing members being spaced, at least in their central regions, away from the said inwardly directed flanges by a distance greater than the depth of the flanges at the rear of the squeegee element and the side walls of the backing members being spaced apart by such a distance as to permit the length of the squeegee element embraced by a backing member to flex in its own plane within the backing member, and a bridge-piece provided with means for attaching it to a wiper arm and having its opposite ends hingedly connected to said backing members respectively at points intermediate their ends.

2. A windscreen wiper blade as claimed in claim 1, comprising also a narrow strip of thin flexible material extending from one end to the other of the squeegee element along the rear thereof and through the two backing members, said strip being arranged with its flat surface facing the windscreen so as thereby to permit the squeegee element to flex in its own plane.

3. A windscreen wiper blade as claimed in claim 1, wherein auxiliary means are provided which act on the squeegee element at points intermediate the ends of the backing members, said auxiliary means moving rearwardly to allow the squeegee to flex to a concave form when the blade is wiping over a part of the windscreen of increased curvature, and moving forwardly when the blade curvature is decreasing as the blade moves from a curved to a flat part of the screen, thereby mechanically pushing the said intermediate portions of the squeegee forwardly to conform with the flattened curvature of the screen.

4. Windscreen wiper blade as claimed in claim 1, wherein adjacent ends of two adjacent backing members are spaced apart, the portion of the squeegee element between said ends being fitted with a channel-shaped member for increasing the resistance of this portion to transverse flexing.

5. A windscreen wiper blade as claimed in claim 4, wherein said channel-shaped member has arms which extend from opposite ends thereof within the adjacent backing members, the ends of said arms being adapted to bear on the back of the squeegee element adjacent the central region of that portion of the squeegee element embraced by a yoke.

6. A windscreen wiper blade comprising an elongated squeegee element having flanges extending outwardly in opposite directions adjacent the rear edge thereof, a thin strip of flexible material extending along the rear edge of the squeegee with one of its flat faces directed towards the back of the squeegee, at least two rigid channel-shaped backing members having their side walls spaced apart by a distance slightly greater than the width across the rear flanges of the squeegee, and having their free edges substantially straight and provided with inwardly extending members adapted to fit in front of the rear flanges of the squeegee element, and said backing members being respectively fitted adjacent opposite ends of the squeegee with their side walls and inwardly extending members embracing and extending in front of the flanges at the rear of the squeegee, and with the flexible strip positioned along the back of the squeegee, the channel base of each backing member being, at its central region, spaced away from the metal strip so as to allow the squeegee and flexible strip to move into the backing member and permit the wiping edge of the squeegee to flex to conform to the curvature of the screen, and a bridge-piece interconnecting the two backing members, said bridge-piece carrying means for attaching the blade to a wiper arm.

7. A windscreen wiper blade comprising an elongated squeegee element having flanges projecting outwardly from its opposite surfaces adjacent the rear of the squeegee element, a plurality of rigid channel-shaped backing members each having its channel side walls lying in substantially parallel planes with the internal surfaces of the side walls spaced apart by a distance slightly greater than the width across the flanges at the rear of the squeegee element, said plural backing members being arranged end to end along the back of the squeegee element with the flanges at the back of the squeegee disposed between the channel side walls, flange members extending inwardly from the free edges of the channel side walls and engaging in front of the flanges at the rear of the squeegee element, said flange members being spaced from the rear walls of the channels, at least at the central regions of the channels, by a distance greater than the depth of the flanges at the rear of the squeegee element, whereby said flanges may flex within the channel backing members in the plane of the squeegee element, and means connecting said backing members together for relative rocking movement in the plane of the squeegee.

8. A windscreen wiper blade comprising an elongated squeegee element having flanges projecting outwardly from its opposite surfaces adjacent the rear of the squeegee element, a plurality of rigid channel-shaped backing members each having its channel side walls lying in substantially parallel planes with the internal surfaces of the side walls spaced apart by a distance slightly greater than the width across the flanges at the rear of the squeegee element, said plural backing members being arranged end to end along the back of the squeegee element with the flanges at the back of the squeegee disposed between the channel side walls, flange members extending inwardly from the free edges of the channel side walls and engaging in front of the flanges at the rear of the squeegee element, said flange members being spaced from the rear walls of the channels, at least at the central regions of the channels, by a distance greater than the depth of the flanges at the rear of the squeegee element whereby said flanges may flex within the channel backing members in the plane of the squeegee element, a bridge-piece provided with means for attaching it to a wiper arm, and means connecting opposite ends of said bridge-piece to intermediate points on said backing members, said connecting means permitting relative rocking movement in the plane of the squeegee between the backing members and the bridge-piece.

9. A windscreen wiper blade as claimed in claim 8, wherein said connecting means include a yoke member, opposite ends of which are hingedly connected to intermediate points on two backing members, an intermediate point on the yoke member being connected to an end of the bridge-piece.

10. A windscreen wiper blade comprising an elongated squeegee element having flanges projecting outwardly from its opposite surfaces adjacent the rear of the squeegee element, four rigid channel-shaped backing members arranged end to end along the back of the squeegee element with the flanges at the back of the squeegee element disposed between the channel side walls of said backing members, flange members extending inwardly from the free edges of the channel side walls and engaging in front of the flanges at the rear of the squeegee element, said flange members being spaced from the rear walls of the channels, at least at the central regions of the channels, by a distance greater than the depth of the flanges at the rear of the squeegee element, whereby said flanges may flex within the channel backing members in the plane of the squeegee, a first yoke member opposite ends of which are connected respectively to intermediate points of the two backing members adjacent one end of the blade and in a manner to permit rocking movement in the plane of the squeegee between said two backing members and the first yoke, a second yoke opposite ends of which are connected respectively to intermediate points of the other two backing members adjacent the other end of the blade and in a manner to permit rocking movement in the plane of the squeegee between said other two backing members and the second yoke, and a bridge-piece opposite ends of which are connected respectively to intermediate points of the first and second yoke members in a manner to permit rocking movement in the plane of the squeegee between said yoke members and the bridge-piece.

References Cited in the file of this patent

UNITED STATES PATENTS

| | | |
|---|---|---|
| 2,596,063 | Anderson | May 6, 1952 |
| 2,634,446 | Mackie | Apr. 14, 1953 |
| 2,667,656 | Oishei | Feb. 2, 1954 |

FOREIGN PATENTS

| | | |
|---|---|---|
| 433,467 | Great Britain | Aug. 15, 1935 |
| 619,320 | Great Britain | Mar. 8, 1949 |